(12) United States Patent
Weis et al.

(10) Patent No.: US 11,380,172 B2
(45) Date of Patent: Jul. 5, 2022

(54) METHOD OF USING AN AUTOMATED TELLER MACHINE, METHOD OF OPERATING AN AUTOMATED TELLER MACHINE, AUTOMATED TELLER MACHINE, METHOD OF OPERATING A MOBILE PHONE, AND A MOBILE PHONE

(71) Applicant: Wincor Nixdorf International GmbH, Paderborn (DE)

(72) Inventors: Eduard Weis, Paderborn (DE); Alexander Knobloch, Paderborn (DE)

(73) Assignee: Wincor Nixdorf International GmbH, Paderborn (DE)

( * ) Notice: Subject to any disclaimer, the term of this patent is extended or adjusted under 35 U.S.C. 154(b) by 0 days.

(21) Appl. No.: 17/426,009

(22) PCT Filed: Jan. 28, 2020

(86) PCT No.: PCT/EP2020/052030
§ 371 (c)(1),
(2) Date: Jul. 27, 2021

(87) PCT Pub. No.: WO2020/157059
PCT Pub. Date: Aug. 6, 2020

(65) Prior Publication Data
US 2022/0139176 A1 May 5, 2022

(30) Foreign Application Priority Data
Jan. 28, 2019 (DE) .......................... 102019102005.0

(51) Int. Cl.
*G07F 19/00* (2006.01)
*G06Q 20/32* (2012.01)
(52) U.S. Cl.
CPC ......... *G07F 19/211* (2013.01); *G06Q 20/322* (2013.01); *G06Q 20/327* (2013.01)

(58) Field of Classification Search
None
See application file for complete search history.

(56) References Cited

U.S. PATENT DOCUMENTS

| 2014/0239063 A1* | 8/2014 | Lewis | G07F 19/201 235/379 |
| 2015/0287018 A1* | 10/2015 | Iqbal | G06Q 20/18 705/44 |
| 2016/0171883 A1* | 6/2016 | Kvetny | G09B 21/001 340/944 |

FOREIGN PATENT DOCUMENTS

| DE | 20001117 U1 | 6/2001 |
| EP | 1643468 A1 | 4/2006 |

OTHER PUBLICATIONS

International Search Report and Written Opinion filed in the corresponding PCT Application (written in German language); 13 pages.

\* cited by examiner

*Primary Examiner* — Kristy A Haupt
(74) *Attorney, Agent, or Firm* — Black, McCuskey, Souers & Arbaugh LPA

(57) ABSTRACT

In various embodiments, there is provided a method of using an automated teller machine, wherein the ATM is coupled to a mobile phone of a user of the ATM via a Bluetooth low energy connection; a first string representative of what operating capabilities the ATM currently provides to the user is sent from the ATM to the mobile phone of the user via the Bluetooth low energy connection; and from the mobile phone, the first string is read to the user using a text-to-speech function, wherein based on the reading of the first string, the user knows what operating options the user currently has to use the ATM and can then use the ATM.

16 Claims, 2 Drawing Sheets

METHOD OF USING AN AUTOMATED TELLER MACHINE, METHOD OF OPERATING AN AUTOMATED TELLER MACHINE, AUTOMATED TELLER MACHINE, METHOD OF OPERATING A MOBILE PHONE, AND A MOBILE PHONE

CROSS-REFERENCE TO RELATED APPLICATIONS

This is a national phase application of PCT/EP2020/052030, which was filed on Jan. 28, 2020, and which claims priority to German Patent Application DE 10 2019 102 005.0, and which was filed on Jan. 28, 2019, the contents of each of which are incorporated herein by reference in their entirety.

BACKGROUND

ATMs commonly offer an audio interface to guide people with visual impairments through the menus. For this, a user can connect a standard pair of headphones with a jack plug to the ATM. Via the headphones, the user receives instructions corresponding to the current screen content for using the ATM. If the user does not have headphones available, the user cannot use this ATM function. If the user is also visually impaired, the user may not be able to use the ATM at all without headphones.

In addition, the trend lately is that headphones are no longer connected to mobile phones via jack plugs, but rather wirelessly via Bluetooth. Thus, some smartphones no longer use a dedicated jack plug and instead offer Bluetooth headphones, standard. It would therefore be desirable to enable the use of wireless headphones at ATMs as well, especially via a Bluetooth connection, such as a Bluetooth Low Energy (BLE) connection. There are, however, a number of technical problems associated with this.

Wireless headphones must generally be coupled with a corresponding audio source. Normally, one performs such a coupling with a mobile phone, and generally with a smartphone. Direct coupling with the ATM is technically possible, but it would be very time-consuming and would require that the connection between the headphones and the mobile phone be terminated beforehand. Especially for a visually impaired person, this process would be too cumbersome. In addition, wireless headphones usually do not use a BLE connection for audio transmission. Unfortunately, BLE is only occasionally used for establishing the Bluetooth connection.

Alternatively, the ATM could establish a normal Bluetooth connection (i.e., not a BLE connection) to the mobile phone and use this indirect route to play the audio guide on the headphones. For an audio transmission with normal Bluetooth, for example, the standardized "Advanced Audio Distribution Profile" (A2DP) is currently used. This can be used to establish an audio connection from an audio source to an audio sink. Unfortunately, neither Android OS mobile phones nor iOS mobile phones currently support the role of the audio sink without changes in the operating system. Furthermore, the A2DP protocol is not supported by BLE.

The audio transmission would therefore have to be done via a different protocol. However, there is the problem of the data rate of the transmission. For example, there is a protocol from Texas Instruments that requires a data rate of 136.67 kbps (66.67 kpbs payload). This rate can theoretically be achieved with BLE (a rate of up to 1 Mbit/s is theoretically possible), but it is not supported by smartphones. Realistic data rates for mobile phones with Android operating systems are below 60 kbps and for mobile phones with iOS operating systems below 32 kbps.

BRIEF SUMMARY OF FIGURES

The following is shown by the figures.

DETAILED DESCRIPTION

Figure 1:
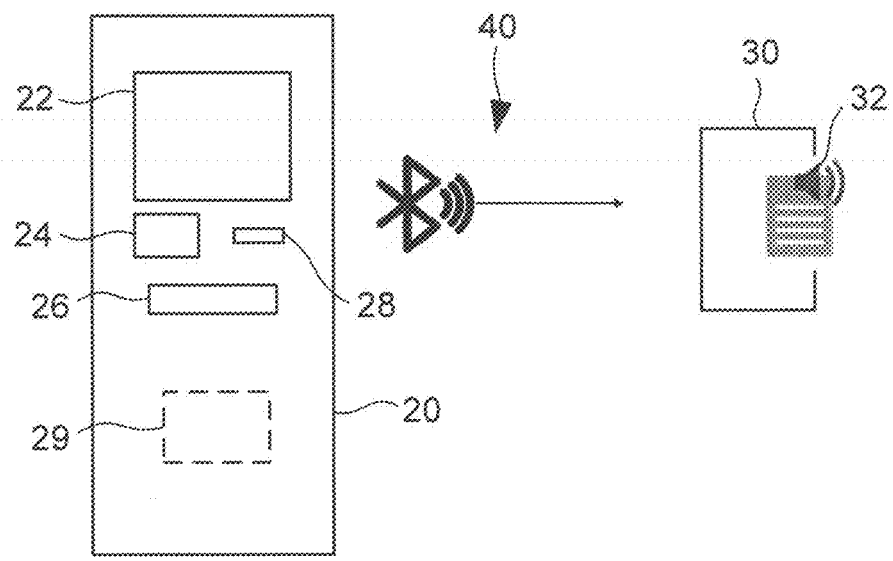
FIG. 1: Examples of an ATM and a mobile phone.

The invention relates to a method of using an Automated Teller Machine (ATM), a method of operating an ATM, an ATM, a method of operating a mobile phone, and a mobile phone. One object of the invention is to provide a method of using an ATM that enables the ATM to be used via audio information in a simple and inexpensive manner.

One object of the invention is to provide a method of operating an ATM that enables the ATM to be used via audio information in a simple and inexpensive manner.

One object of the invention is to provide an ATM that enables use of the ATM via audio information in a simple and inexpensive manner.

One object of the invention is to provide a method of operating a mobile phone that enables an ATM to be used via audio information in a simple and inexpensive manner.

One task of the invention is to provide a mobile phone that enables an ATM to be used by means of audio information in a simple and inexpensive manner.

An object of the invention is solved by a method of using an ATM, wherein the ATM is coupled to a mobile phone of a user of the ATM via a Bluetooth low energy (BLE) connection; a first string, the content of which relates to the operation of the ATM, is sent from the ATM to the mobile phone of the user via the BLE connection; and the first string is read aloud from the mobile phone to the user using a text-to-speech function, and the user can use the ATM accordingly.

The present invention is based, firstly, on the fact that the information relating to the operating options that the ATM is currently offering to the user consists only of text and does not have to be reproduced as arbitrary sounds, noises, images and/or videos, and the transmission of the corresponding data can therefore be in text form, i.e. as a string, in other words as a character string. For example, the example text "Hello, this is an instruction for using a user interface" requires 68 bytes as a string, i.e. 544 bits. In the form of an mp3 audio file, the spoken text at a bit rate of 40 kbps, for example, requires a storage space of 22.3 kBytes, or 178.4 kbit. Compared with the transmission of audio and/or video data, the transmission of the string thus requires a significantly lower data rate or bit rate, and the string can be transmitted without further steps by using the BLE connection. The text relating to the operating options for using the ATM can thus be transmitted to the mobile phone while maintaining a very limited data rate.

The present invention is based, secondly, on the fact that conventional mobile phones, in particular smartphones, generally have a standard text-to-speech function. Such a mobile phone can use the text-to-speech function to convert the text received as a string into speech and to play it back using a suitable output unit, for example by using the loudspeaker built into the mobile phone or a loudspeaker coupled to the mobile phone, such as, for example, headphones. Corresponding libraries are available in most common mobile phone operating systems.

Thus, the method of using the ATM allows the ATM to be operated using audio information in a simple and inexpensive manner. In particular, a connection can be established between the ATM and the mobile phone to provide audio instructions for using the ATM, for example to a visually impaired user. The user does not need to carry headphones, especially those with jack plugs, but only the user's mobile phone. The instructions can be played back from the phone's speaker or, if available, from the headphones.

The coupling of the ATM with the user's mobile phone via the Bluetooth Low Energy (BLE) connection can be achieved in a conventional way, for example. Since this coupling is standardized and corresponds to the relevant official protocols, this description will not go into more detail about the relevant standard and protocols, but merely refers to the relevant literature in this field.

The string and, if applicable, other strings can be sent from the ATM to the mobile phone, for example, using a proprietary BLE Gatt service. The content relating to the operation of the ATM may, for example, be representative of what operation options the user currently has at the ATM and/or what information the ATM is currently presenting to the user on a first display unit of the ATM.

To establish the BLE connection, i.e., to couple the mobile phone with the ATM, to receive the string and to play back the audio, i.e., to read out the corresponding text, an application, or app for short, can be stored on the mobile phone.

According to a further embodiment, prior to coupling the ATM with the mobile phone, the mobile phone sends a coupling message to the ATM, the coupling message representing that the mobile phone is to be coupled with the ATM. The coupling with the mobile phone is initiated by the ATM in response to the ATM receiving the coupling message. The coupling message may, for example, be a part of the corresponding BLE standard and/or BLE protocol for coupling the mobile phone with the ATM.

According to a further embodiment, prior to sending the coupling message, the ATM sends an information message representing that the ATM is able to send the string over the BLE connection. In response to receiving the information message, the coupling message is sent from the mobile phone.

According to a further embodiment, the operating options that the ATM is currently offering the user and/or the information that the ATM is currently displaying on the first display unit changes as a result of the user using the ATM. A second string representative of what operating options the user currently has at the ATM and/or what information the ATM is currently displaying on the first display unit is sent from the ATM to the user's mobile phone via the BLE connection. The second string is read out to the user on the mobile phone using the text-to-speech function, whereby the user knows from the reading out of the second string, which operating options the user currently has and/or what the ATM is currently displaying on the first display unit, and can then use the ATM again.

According to a further embodiment, at the end of the user's operation of the ATM, the BLE connection between the ATM and the mobile phone is disconnected and the ATM resends the information message.

A task of the invention is solved by a method of using an ATM, in which the ATM is coupled to a mobile phone of a user of the ATM via a BLE connection. A first string, the content of which relates to the operation of the ATM, is sent from the ATM to the user's mobile phone via a BLE connection.

According to a further embodiment, prior to coupling the ATM with the mobile phone, the ATM receives from the mobile phone a coupling message representing that the mobile phone is to be coupled with the ATM. The ATM initiates coupling with the mobile phone in response to receiving the coupling message.

According to a further embodiment, prior to sending the coupling message, the ATM sends an information message representing that the ATM is capable of sending the first string over the BLE connection.

According to a further embodiment, as a result of an operation of the ATM by the user, the operating options that the user currently has at the ATM and/or the content that the ATM is currently displaying on the first display unit change, and a second string representing the operating options the user currently has at the ATM and/or what the ATM is currently displaying on the first display unit is sent from the ATM to the user's mobile phone via the BLE connection.

According to a further embodiment, at the end of the user's operation of the ATM, the BLE connection between the ATM and the mobile phone is disconnected, and the ATM resends the information message.

An object of the invention is solved by an automatic teller machine comprising a first display unit; a first input unit; a card reader unit; a cash dispenser unit; and a first control unit, which is electrically connected to the first display unit, the first input unit, the card reader unit, and the cash dispenser unit, and which is designed to execute the method of using an automatic teller machine explained above.

An object of the invention is solved by a method of using a mobile phone, wherein the mobile phone is coupled to an ATM via a BLE connection; a first string sent from the ATM, the content of which relating to the operation of the ATM, is received by the mobile phone via the BLE connection; the mobile phone reads the first string to the user using a text-to-speech function; and the user can use the ATM accordingly.

According to a further embodiment, prior to coupling the ATM with the mobile phone, the mobile phone sends a coupling message to the ATM, representing that the mobile phone is to be coupled with the ATM.

According to a further embodiment, prior to sending the coupling message, an information message of the ATM is received, the information message representing the ATM being able to send the string over the BLE connection. In response to receiving the information message, the coupling message is sent by the mobile phone.

According to a further embodiment, as a result of the user using the ATM, the operating options that the user currently has at the ATM and/or the content that the ATM is currently displaying on the first display unit change, and a second string that is sent by the ATM and that is representative of the operating options that the user currently has at the ATM and/or the content that the ATM is currently displaying on the first display unit is received by the mobile phone via the BLE connection. The second string is read out to the user by the mobile phone using the text-to-speech function, wherein based on the reading out of the second string, the user knows what operating options the user currently has to use the ATM and/or what content the ATM is currently displaying on the first display unit, and can then use the ATM again.

An object of the invention is solved by a mobile phone comprising a second display unit; a second input unit; an output unit; a transmitting/receiving unit; a second control unit, which is electrically connected to the second display unit; the second input unit; the output unit, and the transmitting/receiving unit, and which is configured to execute the method of using a mobile phone explained in the foregoing.

Examples of embodiments of the invention are shown in the figures and are explained in more detail below.

In the following detailed description, reference is made to the accompanying drawings which form part of this description and in which specific embodiments in which the invention may be practiced are shown for illustrative purposes. Since components of embodiments may be positioned in a number of different orientations, the directional terminology is for illustrative purposes and is not limiting in any way. It is understood that other embodiments may be used and structural or logical changes may be made without departing from the scope of protection of the present invention. It is understood that the features of the various embodiments described herein may be combined with each other, unless specifically indicated otherwise. Therefore, the following detailed description is not to be construed in a limiting sense, and the scope of protection of the present invention is defined by the appended claims. In the figures, identical or similar elements are indicated by identical reference signs where appropriate.

FIG. 1 shows embodiments of an automatic teller machine 20 and a mobile phone 30. The automatic teller machine 20 includes a first display unit 22, a first input unit 24, a cash dispensing unit 26, a card reading unit 28, and a first control unit 29. The first control unit 29 is electrically connected to the first display unit 22, the first input unit 24, the cash dispensing unit 26 and the card reading unit 28. Using the ATM 20, a user can withdraw cash from the ATM 20. Optionally, the ATM 20 may be configured to allow cash to be deposited into an account of the user using the ATM 20.

The display unit 22 is, for example, a display, in particular an LCD display or an OLED display. The display unit 22 is used to provide information to the user regarding the operation of the ATM. For example, control fields for using the ATM 20 may be displayed on the display unit 22. If the display unit 22 is a touch screen, the ATM 20 may be used directly by pressing the corresponding control fields. Alternatively, or in addition, the control fields may be displayed directly adjacently to buttons that are not shown in the figures and that are located outside of the display unit 22, such that the control fields serve only as labels for the buttons. In other words, the display unit 22 may serve to label buttons outside of the display unit 22. This allows that in different operating states of the ATM 20, the buttons may be labeled differently and may trigger different functions accordingly. Further, the information regarding the operation of the ATM 20 may include information that only indirectly relates to the operation of the ATM 20, for example, information regarding the user's account, such as the account number and/or balance. Finally, the display unit 22 may be used to display advertisements.

The input unit 24 is, for example, a keyboard. The input unit 24 is used, for example, to use the ATM 20. For example, the input unit 24 may be used to enter a PIN and/or an amount of money to be withdrawn. The input unit 24 may be arranged alternatively or in addition to the buttons previously mentioned. If the display unit 22 is a touch screen, the input unit 24 and the display unit 22 may be integrated in a common display device.

The cash dispensing unit 26 is used to disburse cash to the user. If the ATM 20 is configured to deposit cash into the user's account via the ATM 20, the cash dispensing unit 26 may also serve to guide the cash into the ATM 20. Alternatively, the ATM 20 may include a separate compartment for depositing cash.

The card reader unit 28 is used to receive and read the user's ATM card. Using the ATM card, the user can inform the ATM 20 which account the user has. Together with a secret number to be entered into the input unit 24, the ATM card is used to enable or disable access to the user's account. At the end of the user's operation of the ATM 20, the card reader unit 28 releases the ATM card. The ATM card may be, for example, a debit card (e.g. EC-card) or a credit card.

The control unit 29 is used to control the display unit 22 to display the information regarding the operation of the ATM 20; to detect the user's inputs via the buttons and/or the input unit 24 and to start or cancel corresponding functions; to control the cash dispensing unit 26 to dispense the desired amount of money to the user; and/or to match the data of the ATM card detected by the card reading unit 28 with the PIN and/or the user's account.

The mobile phone 30 may be, for example, a smartphone or a conventional mobile phone. The mobile phone 30 includes a second display unit, for example a screen, for displaying information, a second input unit for inputting data, an output unit 32, a send/receive unit, and a second control unit. The screen and the second input unit may be integrated into a common touch screen. The transmit/receive unit is for transmitting and receiving data. The second control unit is electrically coupled to the second display unit, the second input unit, the output unit 32, and the transmit/receive unit. The second control unit is used to use the second display unit, the second input unit, the output unit 32, and the transmit/receive unit.

The output unit 32 is used for outputting audio information. For example, the output unit 32 may be a speaker of the mobile phone 30. Alternatively, the output unit 32 may be a pair of headphones that can be coupled with the mobile phone 30 and that can then be used to acoustically reproduce the audio information of the mobile phone 30. The coupling of the mobile phone 30 with the headphones may be wired or wireless. In a wireless connection, the coupling of the mobile phone 30 with the headphones may, for example, be performed using Bluetooth.

The ATM 20, in particular the first control unit 29, and the mobile phone 30, is configured such that the ATM 20 can be coupled to the mobile phone of the user of the ATM 20 via a Bluetooth low energy (BLE) connection 40, such that a first string, the content of which relates to the operation of the ATM 20, can be sent from the ATM 20 to the user's mobile phone 30 via the BLE connection 40, and that the content of the first string can be read out to the user by the mobile phone 30 using a text-to-speech function of the mobile phone 30, and the user can use the ATM 20 accordingly.

This method of using the ATM 20, the corresponding method of operating the ATM 20, and the corresponding method of operating the mobile phone 30 are explained in greater detail below with reference to FIGS. 2, 3, and 4.

Figure 2:
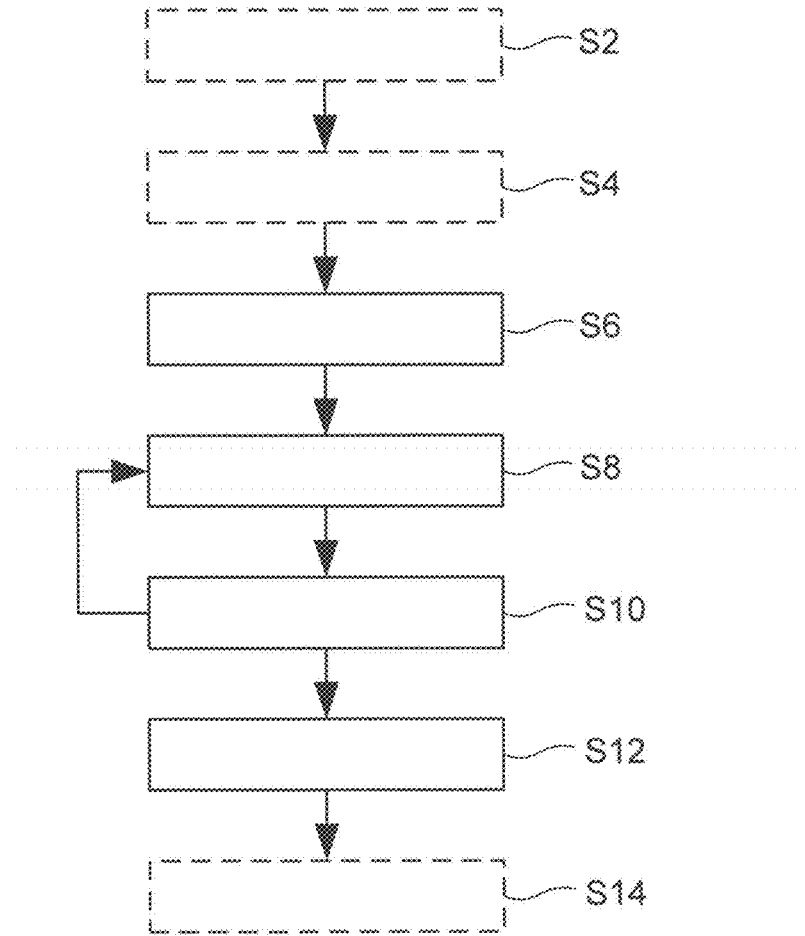
FIG. 2: A flow chart of an example of a method of using an ATM.

FIG. 2 shows a flowchart of an embodiment of a method of using an ATM 20, in particular with respect to the ATM 20 previously discussed.

The method of using the ATM 20 provides a simple and inexpensive way to use the ATM using audio information. In particular, a BLE connection can be established between the ATM 20 and the mobile phone 30 to provide audio information and/or instructions for using the ATM, such as for a visually impaired user. The user does not need to carry headphones for this purpose, in particular headphones with a jack plug, but only the user's mobile phone 30. The instructions can be played back directly by the speaker of the mobile phone 30 or, if present, by the headphones, which are provided with the corresponding audio files by the mobile phone 30.

In an optional step S2, an information message representing that the ATM 20 is capable of transmitting, over a Bluetooth low energy (BLE) connection 40, a string whose content relates to the operation of the ATM 20, may be sent by the ATM 20. The information message may also be referred to as a BLE commercial or a BLE advertisement. The information message may be sent in the form of information packets, for example as advertisements packets. The information message may be sent, for example, as long and/or often as necessary until a coupling between the ATM 20 and the mobile phone 30 occurs.

In an optional step S4, the information message can be received by the mobile phone 30. For receiving the information message and for processing the information message, corresponding software, in particular an application, "app" for short, may be installed and executed on the mobile phone 30. The application may signal to the user that it has received the information message and/or that the ATM 20 is capable of sending, via the BLE connection 40, the string whose content relates to the operation of the ATM 20.

Further, in the step S4, a coupling message may be sent to the ATM 20, the pairing message representing that the mobile phone 30 is to be coupled with the ATM 20. If, in the step S2, the ATM 20 transmits the information message and the information message is received by the mobile phone 30, the coupling message may be transmitted by the mobile phone 30 in response to receiving the information message.

The information message and/or the coupling message may be portions of a conventional BLE standard and/or a conventional protocol suitable for BLE. Alternatively, the information message and/or the coupling message may initiate coupling of the ATM 20 with the mobile phone 30 according to the conventional BLE standard and/or a conventional protocol suitable for BLE.

In a step S6, the ATM 20 is coupled with the mobile phone 30 of the user of the ATM 20 via the BLE connection 40. This coupling may also be referred to as pairing. The coupling of the ATM 20 with the mobile phone 30 may be achieved via conventional BLE standards and/or via a conventional protocol suitable for BLE. In some cases, the information message and/or the coupling message may be used for this coupling or may be sent or received in addition to this coupling. On the mobile phone 30 side, the coupling may be performed using the application. Furthermore, in the step S6, the sending of the information message may be stopped so that no other mobile phone can receive the information message while the mobile phone 30 is coupled with the ATM 20.

Once the ATM 20 is coupled with the mobile phone 30 via the BLE connection 40, in a step S8, a string, for example a first string whose content relates to the operation of the ATM 20, is sent from the ATM 20 to the user's mobile phone 30 via the BLE connection 40. The first string and any additional strings may be sent, for example, using a proprietary BLE Gatt service. A string is fundamentally a string of characters and the content of the string is text. The content of the first string may include: information relating to the operation of the ATM 20, for example instructions on how to use the displace surface currently displayed on the display unit 22; and/or Information relating only indirectly to the operation of the ATM 20, for example information about the user's account, for example the account number and/or balance.

In a step S10, the mobile phone 30, in particular via the application and the output unit 32, receives the string, for example the first string, and reads the content of the first string to the user using a text-to-speech function of the mobile phone 30. The text-to-speech function may be part of the operating system of the mobile phone 30 or part of the application.

After the information regarding the operation of the ATM 20 has been read to the user, the user can appropriately use the ATM 20. Generally, the information displayed on the display unit 22 and the options for using the ATM 20 changes during operation of the ATM 20. For example, a selection option may be initially displayed to the customer via the display unit 22, according to which the customer may select whether the customer wants to know his account balance or whether he wants to withdraw money. The corresponding information may be encoded in the first string. If the customer wishes to withdraw money and uses the ATM accordingly, a selection option may be displayed to the customer via the display unit 22, which allows the customer to select how much money he wishes to withdraw. In this case, step S8 may be processed again, wherein when step S8 is processed again, a second string representative of the operating options the user currently has at the ATM 20 and/or what information the ATM is currently displaying on the first display unit 22 is sent to the user's mobile phone 30 via the BLE connection 40.

Subsequently, step S10 can be processed again, wherein during the renewed processing of step S10, the mobile phone 30 reads the second string to the user using the text-to-speech function, wherein the user knows, due to the reading of the second string, which operating options he currently has at the ATM 20 and/or what the ATM 20 is currently displaying on the first display unit 22. Subsequently, the user can use the ATM 20 again. In this way, steps S8 and steps S10 can be processed repeatedly in succession with different strings matched to the current operating options and/or displayed information until the user cancels operation of the ATM 20 or the operating process is automatically terminated.

In a step S12, at the end of the user's operation of the ATM 20, the BLE connection 40 between the ATM 20 and the mobile phone 30 is disconnected, for example, according to the conventional BLE standard and/or the conventional BLE protocol.

In an optional step S14, the ATM 20 may again transmit the information message. In particular, the information message may be sent out as long and/or as often as necessary until the ATM 20 is again coupled with the mobile phone 30 or with another mobile phone.

Figure 3:
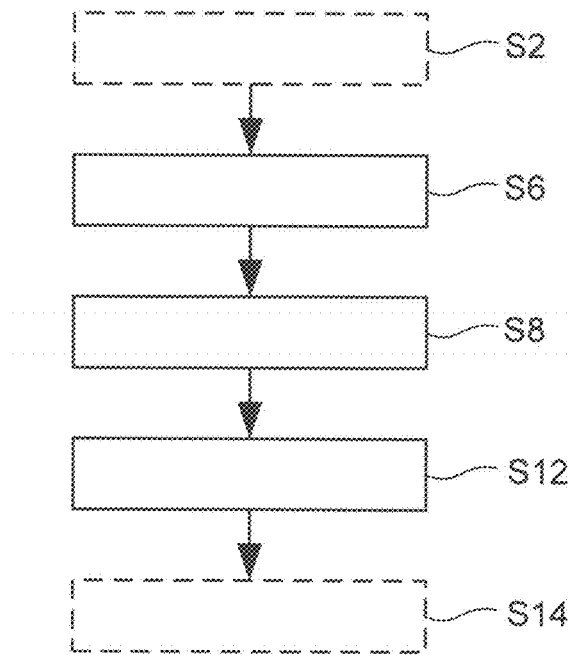
FIG. 3: A flowchart of an example of a method of operating an ATM.

FIG. 3 shows a flow diagram of an embodiment of a method of operating an ATM, for example the ATM 20 previously described. The method of operating the ATM 20 is part of the method of using the ATM 20 previously described, wherein the method of operating the ATM 20 refers exclusively to the steps that are performed by the ATM 20, in particular by the first control unit 29 of the ATM 20.

In optional step S2, the ATM 20 may send out the information message representing that the ATM 20 is able to send, via the BLE connection 40, the string whose content relates to the operation of the ATM 20. The information message may be sent for as long and/or as often as it takes to couple the ATM 20 with the mobile phone 30.

In the step S6, the ATM 20 is coupled with the mobile phone 30 of the user of the ATM 20 via the BLE connection 40. Furthermore, in the step S6, the sending of the information message may be ceased so that no other mobile phone can receive the information message while the mobile phone 30 is coupled with the ATM 20.

Once the ATM 20 is coupled with the mobile phone 30 via the BLE connection 40, in the step S8, the ATM 20 sends a string, for example a first string whose content relates to the operation of the ATM 20, to the user's mobile phone 30 via the BLE connection 40.

After the information regarding the operation of the ATM 20 has been read to the user, the user can suitably use the ATM 20. Typically, the information displayed on the display unit 22 and the ways to use the ATM 20 change during operation of the ATM 20. In this case, step S8 may be processed again, wherein when step S8 is processed again, a second string representative of what operating options the user currently has at the ATM 20 and/or what information the ATM 20 is currently displaying on the first display unit 22 is sent to the user's mobile phone 30 via the BLE connection 40. In this way, step S8 can be processed repeatedly in succession with different strings matched to the current operating options and/or displayed information until the user cancels operation of the ATM 20 or the operating process is automatically terminated.

In the step S12, at the end of the user's operation of the ATM 20, the BLE connection 40 between the ATM 20 and the mobile phone 30 is disconnected.

In optional step S14, the ATM 20 may again send out the information message.

Figure 4:
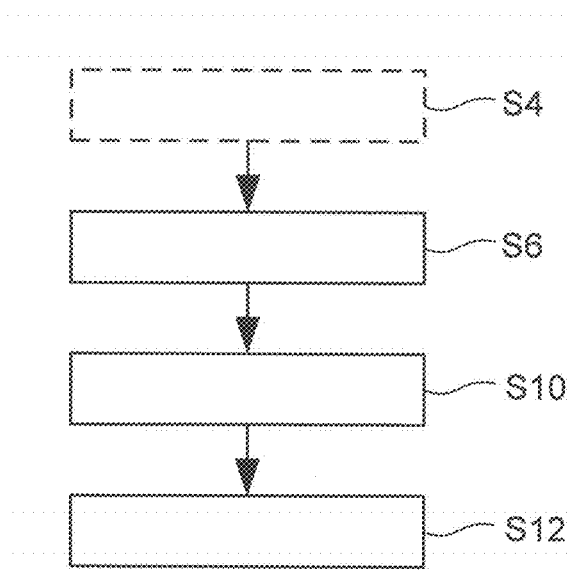
FIG. 4: A flowchart of an embodiment of a method of operating a mobile phone.

FIG. 4 shows a flowchart of an embodiment of a method of using a mobile phone, for example the mobile phone 30 explained in the foregoing. The method of operating the mobile phone 30 is part of the method of using the ATM 20 explained in the foregoing, wherein the method of using the mobile phone 30 refers exclusively to the steps that are processed by the mobile phone 30, in particular by using the application installed on the mobile phone 30.

In optional step S4, the mobile phone 30 may receive the information message, as applicable. The application may signal to the user that it has received the information message and/or that the ATM 20 is capable of sending, via the BLE connection 40, the string whose content relates to the operation of the ATM 20. Further, in the step S4, the coupling message may be sent to the ATM 20. The coupling message may be sent out by the mobile phone 30 in response to receiving the information message.

In the step S6, the ATM 20 is coupled with the mobile phone 30 of the user of the ATM 20 via the BLE connection 40. The coupling may be performed via the application.

In step S10, the mobile phone 30, for example by using the application and the output unit 32, receives the string, for example the first string, and reads the content of the first string to the user by using the text-to-speech function of the mobile phone 30.

After the information regarding the operation of the ATM 20 is read to the user, the user can use the ATM 20 appropriately. The information displayed on the display unit 22 and the ways to use the ATM 20 typically change during the operation of the ATM 20. In this case, the step S10 may be processed again, wherein when the step S10 is processed again, the second string is received by the mobile phone 30 and the second string is read out to the user using the text-to-speech function.

In a step S12, at the end of the user's operation of the ATM 20, the BLE connection 40 between the ATM 20 and the mobile phone 30 is disconnected, for example, according to a conventional BLE standard and/or the conventional BLE protocol.

The invention is not limited to the specifically provided embodiments. For example, the ATM 20 and/or the mobile phone 30 may include more or fewer of the components than those illustrated. Further, the methods explained in the foregoing may have more or fewer steps than those illustrated. Further, the order of the steps explained in the foregoing may be changed within the respective methods.

REFERENCE LIST

20 ATM
22 First display unit
24 First input unit
26 Money output unit
28 Card reader
29 First control unit
30 Mobile phone
32 Output unit
40 BLE connection
S2 to S14 Steps two to fourteen

The invention claimed is:

1. A method of transferring data for audio instruction operation of an automatic teller machine (ATM), comprising:
   coupling the ATM to a mobile phone of a user of the ATM via a Bluetooth low energy connection;
   sending from the ATM a first string whose content relates to the operation of the ATM to the mobile phone via the Bluetooth low energy connection; and
   reading out the content of the first string to the user using a text-to-speech function of the mobile phone.

2. The method of claim 1, further comprising:
   sending, prior to coupling the ATM with the mobile phone, from the mobile phone, a coupling message to the ATM, wherein the coupling message represents that the mobile phone is to be coupled with the ATM, and
   initiating coupling with the mobile phone by the ATM in response to receiving the coupling message.

3. The method of claim 2, further comprising:
   sending an information message from the ATM prior to the sending of the coupling message, the information message representing that the ATM is capable of sending the first string over the Bluetooth low energy connection, and
   wherein the coupling message is sent from the mobile phone in response to receiving the information message.

4. The method of claim 3, further comprising:
   disconnecting the Bluetooth low energy connection between the ATM and the mobile phone at the end of the user's operation of the ATM, and
   sending the information message again by the ATM.

5. The method of claim 1, wherein
   in the process of the user operating the ATM, operating options that the user currently has at the ATM change and/or the information that the ATM is currently displaying on the first display unit changes; further comprising:
   sending a second string representative of operating options the user currently has at the ATM and/or information the ATM is currently being displayed on the first display unit from the ATM to the mobile phone via the Bluetooth low-energy connection; and reading the second string to the user by the mobile phone using the text-to-speech function.

6. A method of operating an automated teller machine (ATM), comprising:
coupling the ATM to a mobile phone of a user of the ATM via a Bluetooth low energy connection;
sending a first string whose content relates to the operation of the ATM the ATM to the mobile phone via the Bluetooth low-energy connection.

7. The method of claim 6, further comprising:
receiving from the mobile phone, prior to coupling the ATM with the mobile phone, a coupling message representing that the mobile phone is to be coupled with the ATM, and
initiating coupling with the mobile phone by the ATM in response to receiving the coupling message.

8. The method of claim 7, further comprising:
sending by the ATM, prior to sending the coupling message, an information message representing the ATM being capable of sending the first string over the Bluetooth low energy connection.

9. The method of claim 6, in which
as a result of an operation of the ATM by the user, operating options that the ATM is currently offering to the user and/or the content that the ATM is currently displaying on the first display unit change, further comprising:
sending a second string representative of control options the user currently has at the ATM and/or control options that the ATM is currently displaying on the first display unit via the ATM to the mobile phone via the Bluetooth low energy connection.

10. The method of claim 6, further comprising:
disconnecting the Bluetooth low energy connection between the ATM and the mobile phone at the end of the operation of the ATM by the user, and
sending the information message again by the ATM.

11. An automatic teller machine (ATM) comprising
a first display unit;
a first input unit;
a card reader unit;
a cash dispensing unit; and
a first control unit, which is electrically connected to the first display unit, the first input unit, the first card reader unit, and the first cash dispenser unit, and which is configured to:
couple the ATM to a mobile phone of a user of the ATM via a Bluetooth low energy connection; and
send a first string whose content relates to an operation of the ATM from the ATM to the mobile phone via the Bluetooth low energy connection.

12. A method of controlling a mobile phone, comprising:
coupling the mobile phone with an automatic teller machine (ATM) via a Bluetooth low energy connection;
sending a first string by the ATM, the content of which relates to an operation of the ATM;
receiving the first string by the mobile phone via the Bluetooth low energy connection;
reading by the mobile phone the first string using a text-to-speech function.

13. The method of claim 12, further comprising: sending by the mobile phone, prior to coupling the ATM with the mobile phone, a coupling message to the ATM representing that the mobile phone is to be coupled with the ATM.

14. The method of claim 13, further comprising:
receiving an information message from the ATM prior to sending the coupling message, the information message representing that the ATM is capable of sending the string over the Bluetooth low energy connection, and
sending from the mobile phone sends the coupling message in response to receiving the information message.

15. The method of claim 12, wherein
as a result of the operation of the ATM by the user, the operating options that the ATM is currently offering to the user change and/or the content that the ATM is currently displaying on the first display unit changes, further comprising:
sending a second string by the ATM, wherein the second string represents what control options the user currently has at the ATM and/or what the ATM is currently displaying on the first display unit;
receiving the second string by the mobile phone via the Bluetooth low-energy link; and
reading the second strong by the mobile phone using the text-to-speech function.

16. A mobile phone comprising
a second display unit;
a second input unit;
an output unit;
a transmit/receive unit; and
a second control unit which is electrically connected to the second display unit, the second input unit, the output unit and the transmit/receive unit and which is configured to
couple the mobile phone with an automatic teller machine (ATM) via a Bluetooth low energy connection;
receive a first string sent by the ATM, the content of which relates to the operation of the ATM, via the Bluetooth low energy connection; and
read the first string using a text-to-speech function.

* * * * *